United States Patent
Anderson

(12) 
(10) Patent No.: US 6,356,427 B1
(45) Date of Patent: Mar. 12, 2002

(54) ELECTROSTATIC DISCHARGE PROTECTION CLAMP FOR HIGH-VOLTAGE POWER SUPPLY OR I/O WITH HIGH-VOLTAGE REFERENCE

(75) Inventor: Warren R. Anderson, Westborough, MA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/300,129

(22) Filed: Apr. 27, 1999

(51) Int. Cl.$^7$ ................................................. H02H 3/00
(52) U.S. Cl. ....................... 361/111; 361/91.1; 361/118
(58) Field of Search .......................... 361/56, 91.1, 111, 361/118, 127, 18; 257/368, 395

(56) References Cited

U.S. PATENT DOCUMENTS 5,400,202 A * 3/1995 Metz et al. .................... 361/56
6,268,993 B1 7/2001 Anderson .................... 361/111

OTHER PUBLICATIONS

T.J. Maloney, et al., "Protection of High Voltage Power and Programming Pins," EOS/ESD Symposium 97–246, pp. 246–254 (3A.7.1–3A.7.9) (Sep. 1997).
W.R. Anderson, et al., "ESD Protection for Mixed–Voltage I/O Using NMOS Transistors Stacked in a Cascode Configuration," EOS/ESD Symposium 98–54, pp. 54–62 (2A.1.1.–2A.1.9) (Oct. 1998).

* cited by examiner

*Primary Examiner*—Stephen W. Jackson
(74) *Attorney, Agent, or Firm*—Hamilton, Brook, Smith & Reynolds, P.C.

(57) ABSTRACT

An electrostatic discharge (ESD) protection technique protects a semiconductor device against electrostatic discharge events. The technique uses an ESD protection circuit that includes a two cascode-connected clamps between the protected pad and a reference voltage conductor and two inverter amplifiers for driving the clamps. A control signal that used to control the amplifiers is derived from a high-voltage pad through voltage limiting transistors.

18 Claims, 3 Drawing Sheets

ELECTROSTATIC DISCHARGE PROTECTION CLAMP FOR HIGH-VOLTAGE POWER SUPPLY OR I/O WITH HIGH-VOLTAGE REFERENCE

BACKGROUND OF THE INVENTION

A typical integrated circuit (IC) includes an IC package and a semiconductor device that is physically and electrically connected within the IC package. The semiconductor device typically includes electrostatic discharge (ESD) protection devices that protect the semiconductor device against ESD events that would otherwise cause damage. Generally, the ESD protection devices are located within the semiconductor device in close proximity to semiconductor device pads, which electrically connect to pins of the IC package.

One conventional ESD protection device provides an ESD clamp (or shunt) between the semiconductor pad to be protected and a reference conductor (i.e., a ground conductor). If power is disconnected (e.g., when the semiconductor device is being handled prior to its installation within an IC package, or when an assembled IC is being handled prior to its installation on a circuit board), the ESD protection device shunts or clamps any positive charge on the pad that is above a particular threshold to the reference conductor. If the power is on (e.g., when the assembled IC is installed on a circuit board and is operational), the ESD protection device is deactivated and an signal on the pad is permitted to pass through to other semiconductor device circuitry, i.e., internal circuits of device. An example of such an ESD protection device is described in U.S. application Ser. No. 08/979,376, entitled "Cross-Referenced Electrostatic Discharge Protection Systems and Methods for Power Supplies," filed Nov. 26, 1997, the entire teachings of which are incorporated herein by this reference.

Due to improvements in semiconductor technology, manufacturers can now make transistors smaller thereby reducing semiconductor size and power consumption. The decrease in transistor size has been accompanied by a decrease in transistor voltage tolerance, which is the voltage that can be applied safely across any two terminals of each transistor of the semiconductor device without causing thin oxide damage in the context of MOS-type devices, for example. This maximum tolerable voltage for the transistors is commonly referred to as the rated or process technology voltage. For example, older semiconductor devices were built using a 5V process technology where each transistor could tolerate an operating voltage of 5 Volts (V) across any two terminals without sustaining thin oxide damage. More recently, semiconductor devices have been built using a 3.3V process technology. In such devices, the voltage across any two terminals of each transistor must be less than 3.3V in order to avoid causing thin oxide damage. Presently, manufacturers are implementing 2.5V and 1.5V process technology, and such improvements in semiconductor technology are expected to continue.

Occasionally, manufacturers combine IC's having different semiconductor technologies on the same circuit board or in the same system. For example, a manufacturer may mix some IC's having semiconductor devices built using a 5V process technology with other IC's having semiconductor devices built using a 3.3V process technology in order to obtain some of the benefits of using 3.3V process IC's (e.g., smaller packaging, lower power consumption, greater speed, lower cost). For this an IC containing a semiconductor device using a 3.3V process technology must often be designed to interface with IC's containing semiconductor devices built using a 5V process technology. Specifically, the 3.3V IC must drive and receive signals at the logic levels expected by the 5V IC's in the system. To accomplish this, the 3.3V IC often requires a 5V power supply to power the 3.3V IC's I/O stages. Therefore, the 3.3V IC contains a mixture of 3.3V and 5V circuits.

Providing ESD protection in a mixed voltage IC tends to complicate the design of the ESD clamp and its control circuit. For example, one known semiconductor device includes a cantilevered ESD clamp and an RC-timed control circuit, which is interconnected between the power supply pad and the ESD clamp, to control deactivation of the ESD clamp. When power is off, the RC-timed circuit maintains ESD clamp in a conductive state for a time period related to the circuit's time constant. This allows the shunting of a short ESD event from the pad to a reference conductor. In contrast, when power is on, the RC-timed circuit operates as a voltage divider to divide a 5 V power supply signal down to a 3.6 V signal, which is used to disable the ESD clamp. Without the reduction in voltage from 5 V to 3.6 V, one or more components of the ESD clamp would be very susceptible to thin oxide damage. An example of such a circuit (hereinafter referred to as the "cantilevered circuit") is described in an article entitled "Protection of High Voltage Power and Programming Pins," by Maloney et al., EOS/ESD Symposium 97–246, (1997).

SUMMARY OF THE INVENTION

While having certain advantages relative to its prior art, the cantilevered circuit does suffer from certain performance problems. In particular, the cantilevered circuit is not well-suited for situations where it is desirable to disable ESD protection using a signal that is independent of the signal received on the ESD protected pad. For example, in the above-described cantilevered circuit, the 3.6 V power supply signal that disables the ESD clamp is derived from the 5 V power supply signal received on the protected pad. The 3.6 V power supply signal is not independent of the 5 V power supply signal. Additionally, the RC-timed deactivation feature of the cantilevered circuit may result in inadequate ESD protection against prolonged ESD events, which are on the order of the time constant of the circuit. Furthermore, when the RC-timed circuit operates as a voltage divider during normal operation, the RC-timed circuit generates a leakage current that increases IC power consumption.

The present invention is directed to a technique for protecting a semiconductor device against ESD events that uses a control voltage that is independent of the pad being protected. The ESD stage provides a conducting path between the pad and a reference conductor. In particular, the technique involves providing protection for a high-voltage pad of a semiconductor device. The pad is high-voltage in the sense that it is designed to receive a voltage, during operation, that is greater than a rated or process voltage for the device. A control signal that is used to signal ESD events is derived from an independent pad, which is also high voltage.

In general, according to one aspect, the invention features an electrostatic discharge protection circuit for a protected, high-voltage pad of a semiconductor device to protect its internal circuits from electrostatic discharge. The protected high-voltage pad receives voltages during the operation of the internal circuits that are greater than a rated voltage of the semiconductor device. The protection circuit comprises a clamp stage, comprising at least two cascode-connected transistor clamps between the protected high-voltage pad and a reference conductor. The clamp stage sinks electrostatic charge from the protected high-voltage pad to a reference conductor and away from the internal circuits. A control stage activates the clamp stage to couple electrostatic charge from the protected high-voltage pad and deactivates the clamp stage when the internal circuits are operational by reference to a control signal, which is derived from an independent high-voltage pad. The control stage further reduces a magnitude of the control signal for at least one of the transistor clamps to less than a rated voltage of the semiconductor device.

In specific embodiments, two inverter amplifiers are used to activate and deactivate the transistor clamps. The voltage of the control signal is reduced at the amplifiers to avoid thin-oxide damage.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF PREFERRED EMBODIMENTS

Figure 1:
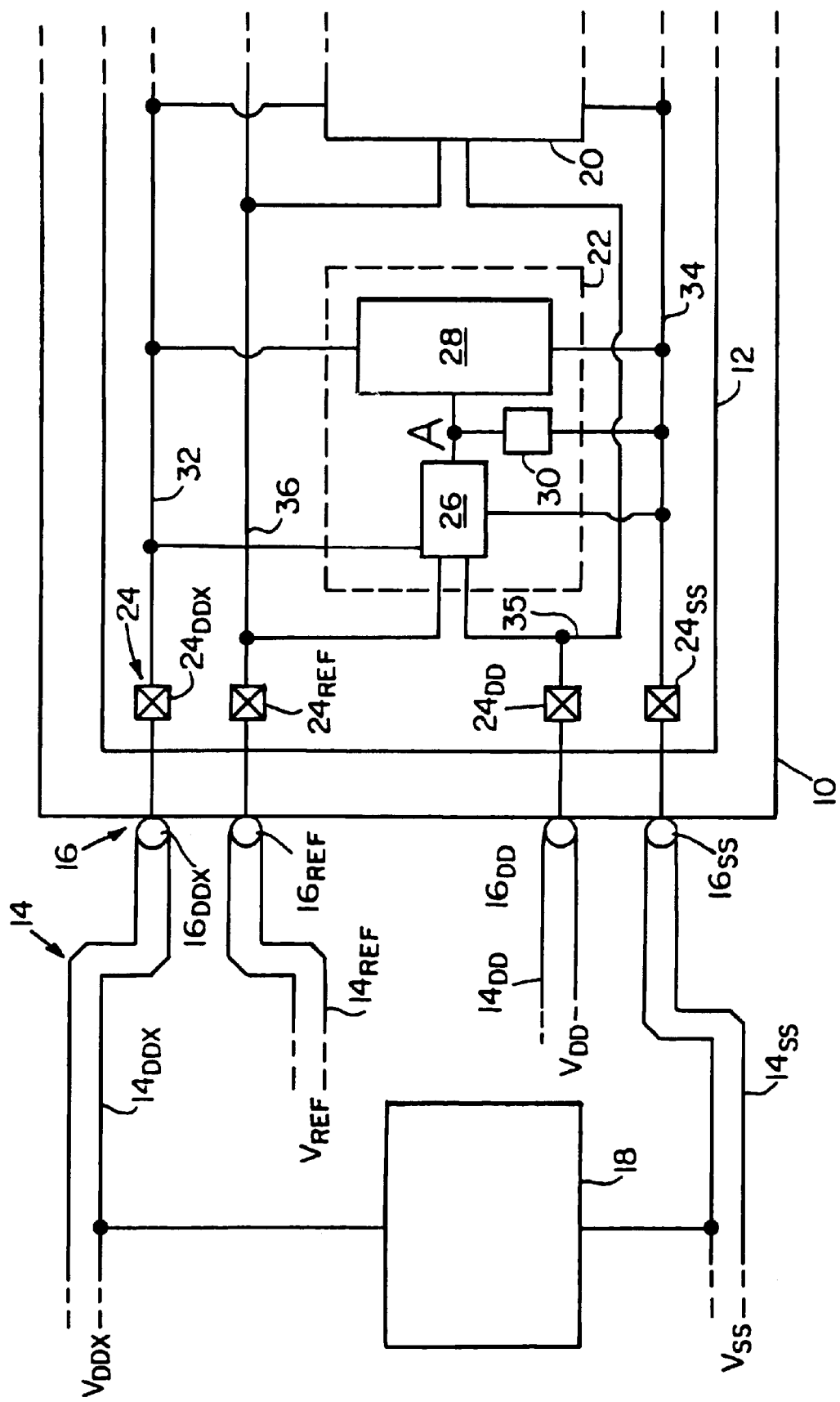
FIG. 1 is a block diagram of an integrated circuit having a semiconductor device that uses an electrostatic discharge (ESD) protection technique according to the present invention.

FIG. 1 shows a portion of a circuit board having an integrated circuit (IC) 10 that includes a semiconductor device 12 that during operation receives voltages on its pad that are greater than the process voltage of its transistors. These pads contain ESD clamping circuits that provide a conducting path that is activated and deactivated based on a control voltage, which is independent of the voltage on the pad.

The IC 10 connects with another circuit or power supply 18 through circuit board conductors $14_{DD}$, $14_{REF}$, $14_{SS}$, $14_{DDX}$ (collectively conductors 14) and IC pins $16_{DD}$, $16_{REF}$, $16_{SS}$, $16_{DDX}$ (collectively pins 16). By way of example, the circuit 18 is a power supply that provides a 3.3 V power supply signal $V_{DDX}$ on conductor $14_{DDX}$, a 3.3 V reference signal $V_{REF}$ on conductor $14_{REF}$, a nominal 2 V power supply signal $V_{DD}$ on conductor $14_{DD}$, and a reference or ground signal $V_{SS}$ on conductor $V_{SS}$.

By way of example, the power supply signal $V_{DDX}$ is an I/O power supply signal that drives I/O circuits of the IC 10 and the reference signal $V_{REF}$ is a reference signal for the I/O circuits or another supply for different I/O circuits as long as $V_{DDX}$ and $V_{REF}$ never connect to one another. In the anticipated implementation, the I/O power supply signal and I/O reference signal are greater than the process voltage of the semiconductor device 12 to thereby allow the IC 10 to function in a legacy system, in which the voltage transitions on I/O signal lines are also greater than the process voltage.

The circuit board conductors $14_{DDX}$, $14_{REF}$, $14_{DD}$, $14_{SS}$ electrically connect to respective semiconductor pads $24_{DDX}$, $24_{REF}$, $24_{DD}$, $24_{SS}$ (collectively pads 24) disposed on a surface of the semiconductor device 12. Within the semiconductor device 12, pad $24_{DDX}$ connects to a high-voltage power supply conductor 32, pad $24_{SS}$ connects to a reference conductor 34, pad $24_{REF}$ connects to a high-voltage reference conductor 36, and pad $24_{DD}$ connects to a nominal voltage supply conductor 35.

The semiconductor device 12 further includes an internal circuit 20 (e.g., an I/O driver stage and core logic) and an ESD protection circuit 22. The internal circuit 20 and the ESD protection circuit 22 connect to the high-voltage power supply conductor 32, the ground reference conductor 34, the high-voltage reference conductor 36, and nominal voltage supply conductor 35. In the example, the I/O drivers of the internal circuits 20 use the high voltage supply signal VDDX to generate output signals to other devices (i.e., electrical signals that vary between zero and 3 V) and the high-voltage reference signal VREF is used by signal input circuits for logic level discrimination or as a supply of other I/O. In this way, a newer technology IC is able to operate in a legacy environment where higher voltage logic level transitions are prohibited.

The ESD protection circuit 22 includes a control stage 26, an ESD clamping stage 28, and a capacitive coupling circuit 30. The control stage 26 connects to the high-voltage I/O power supply conductor 32, the high-voltage reference signal conductor 36, the nominal voltage supply conductor 35, the ground reference voltage conductor 34, and an internal node A. The ESD clamping stage 28 connects to the high-voltage I/O power supply conductor 32, the reference conductor 34, and node A. The capacitive coupling circuit 30 is interconnected between node A and the reference conductor 34.

The ESD protection circuit 22 protects the semiconductor device 12 against ESD events that occur on the pad $24_{DDX}$. In particular, the control stage 26 uses the voltage on the highvoltage reference, and also preferably in conjunction with the voltage on the nominal voltage supply conductor, as a control signal to activate the clamping stage in response to an ESD event, and disable the clamping stage during normal operation when the internal circuit are being powered.

The ESD clamping stage 28 provides a conducting path between the pad $24_{DDX}$ and the reference conductor 34. Accordingly, the ESD protection circuit 22 protects semiconductor circuitry such as the internal circuit 20 against positive ESD events on the pad $24_{DDX}$ by shunting positive ESD charge from the pad $24_{DDX}$ to the reference conductor 34. When the high-voltage reference signal $V_{REF}$ is high (e.g., after the IC 10 has been installed on the circuit board and when the IC 10 is powered-up), the ESD clamping stage 28 is deactivated. Accordingly, the power supply signal $V_{DDX}$ is allowed to power the IC 20 (e.g., the I/O circuits and/or core logic circuits 20 of the semiconductor device 12).

Figure 2:
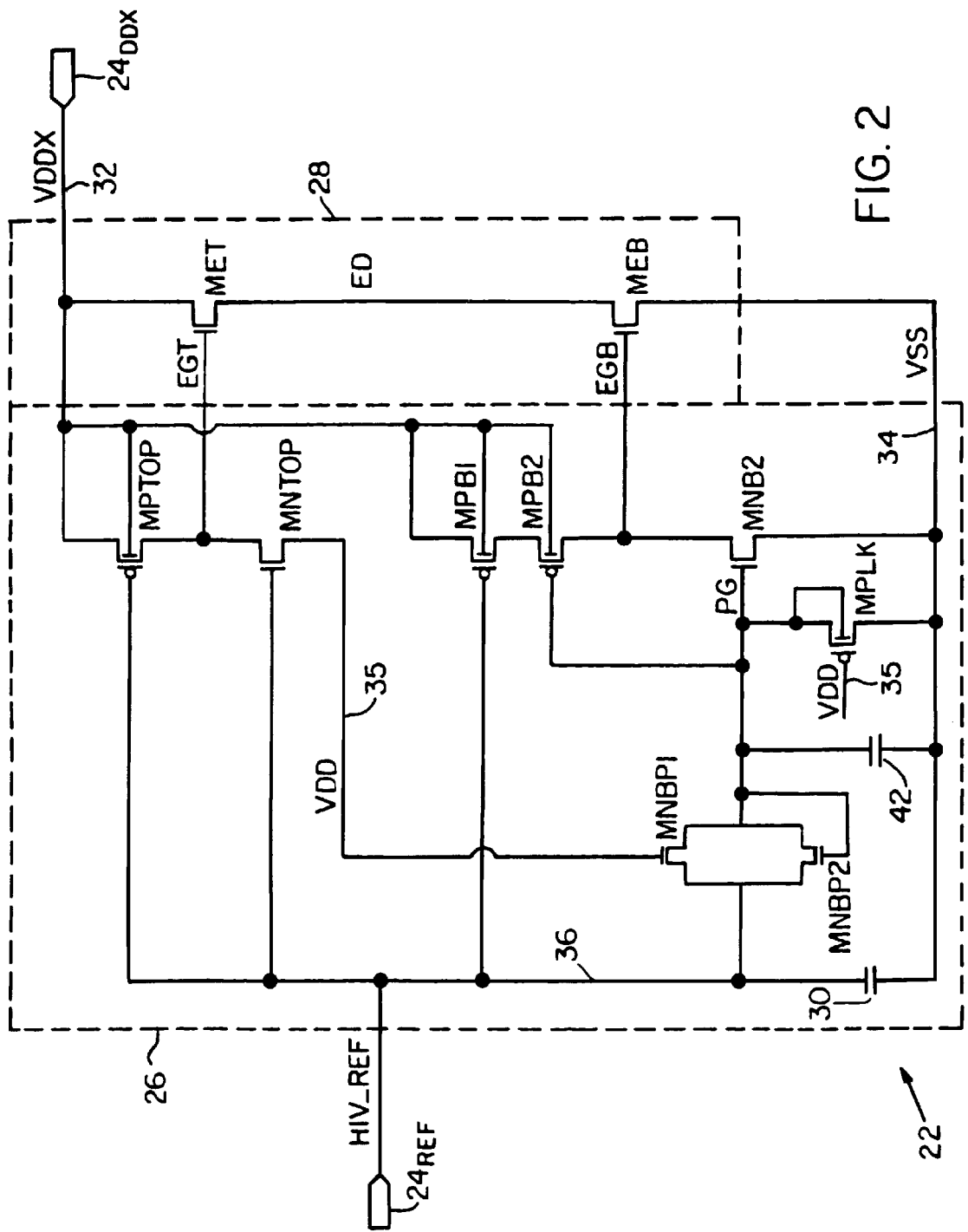
FIG. 2 is a circuit diagram of circuitry within the inventive semiconductor device of FIG. 1, and ally the ESD protection circuit according to the present invention.

FIG. 2 shows the details of the ESD protection circuit 22 of FIG. 1.

The ESD clamping stage 28 comprises two cascode-connected NMOS transistors MET,MEB. Transistors MET and MEB are connected between VDDX conductor 32 and VSS conductor 34. Clamping transistors MET and MEB have relatively wide channel widths in order to carry the ESD charge, and corresponding currents, with small voltage drops.

The clamping transistors MET and MEB are activated and deactivated by the control stage 26. This control is exerted via two signal lines, or nodes, EGT and EGB which are received at the respective gates of clamping transistors MET and MEB.

The first control node EGT is driven by an inverter pair comprising a PMOS transistor MPTOP connected between the VDDX conductor 32 and the control node EGT and an NMOS transistor MNTOP connected between the control node EGT and VDD conductor 35. The gates of the two EGT control node transistors MPTOP and MNTOP are connected to high-voltage reference conductor 36.

The voltage level of the second control node EGB is controlled by another inverter arrangement of transistors. In this case, however, two PMOS transistors MPB1 and MPB2 are cascode connected between the VDDX conductor 32 and the second control node EGB. The lower half of the inverter controlling node EGB comprises an NMOS transistor MNB2 connected between the EGB control node and the ground or voltage reference conductor VSS 34.

The gates of PMOS transistor MPB2 and NMOS transistor MNB2 in the lower inverter, which drives control node EGB, are commonly connected to node PG which is connected to the three-volt, high-voltage reference conductor 36 via two voltage limiting NMOS transistor MNBP1. Voltage limiting transistor MNBP1 has a gate which is connected to nominal voltage conductor VDD 35. Finally, the gate of lower inverter MPB1 is connected to the high-voltage reference conductor REF 36.

During an ESD event, clamp transistors MET and MEB sink current from high-voltage conductor VDDX 32 to the ground or reference conductor VSS 34, thus keeping the voltage on the VDDX conductor 36 as low as possible.

In order to fully activate the clamp transistors, clamp control nodes EGT,EGB should be raised to the same voltage as the ESD voltage on high-voltage power supply conductor VDDX 32. Since high-voltage reference conductor HIV_REF 36 has explicit capacitance 30 to ground reference conductor VSS 34, it will remain at the VSS voltage during ESD. As a result, PMOS transistor MPTOP in the top inverter and MPB1 and MPB2 in the lower inverter are turned on. This ties control nodes EGT and EGB to the ESD voltage on the VDDX conductor 32.

PMOS transistor MNBP2 removes any charge that may couple onto node PG during an ESD event. Finally, additional capacitance 42 may be added between PG and VSS conductor to ensure that it remains at VSS during ESD.

During normal operation in which the internal circuits 20 of the IC10 are powered, no more than 2 Volts is placed between any two terminals of the same device in the ESD protection circuit 22. This design rule avoids thin-oxide damage.

Clamp transistors MET and MEB form a cascode stack. This divides the 3 Volt drop between high-voltage supply conductor VDDX 32 and reference voltage conductor VSS 34.

Node EGT is charged to the nominal supply voltage since NMOS transistor MNTOP is turned-on by the 3 Volts on the high-voltage reference conductor HIV_REF 36 during operation. This limits node ED to rise no higher than an NMOS threshold voltage below VDD, thus dividing the 3 Volts on VDDX safely across MET and MEB.

NMOS transistor MNB2 in the lower inverter pulls the lower control node EGB to the voltage of the reference conductor VSS 34 during normal operation. Its gate voltage, node PG, is derived from the high-voltage reference conductor HIV_REF 36 through pass gate transistor MNBP1. As a result, node PG is a threshold drop below the voltage of nominal voltage conductor VDD.

Finally, pull down transistor MPLK, which is a PMOS device, ensures that node PG does not rise above the voltage of nominal power supply conductor VDD during normal operation.

Figure 3:
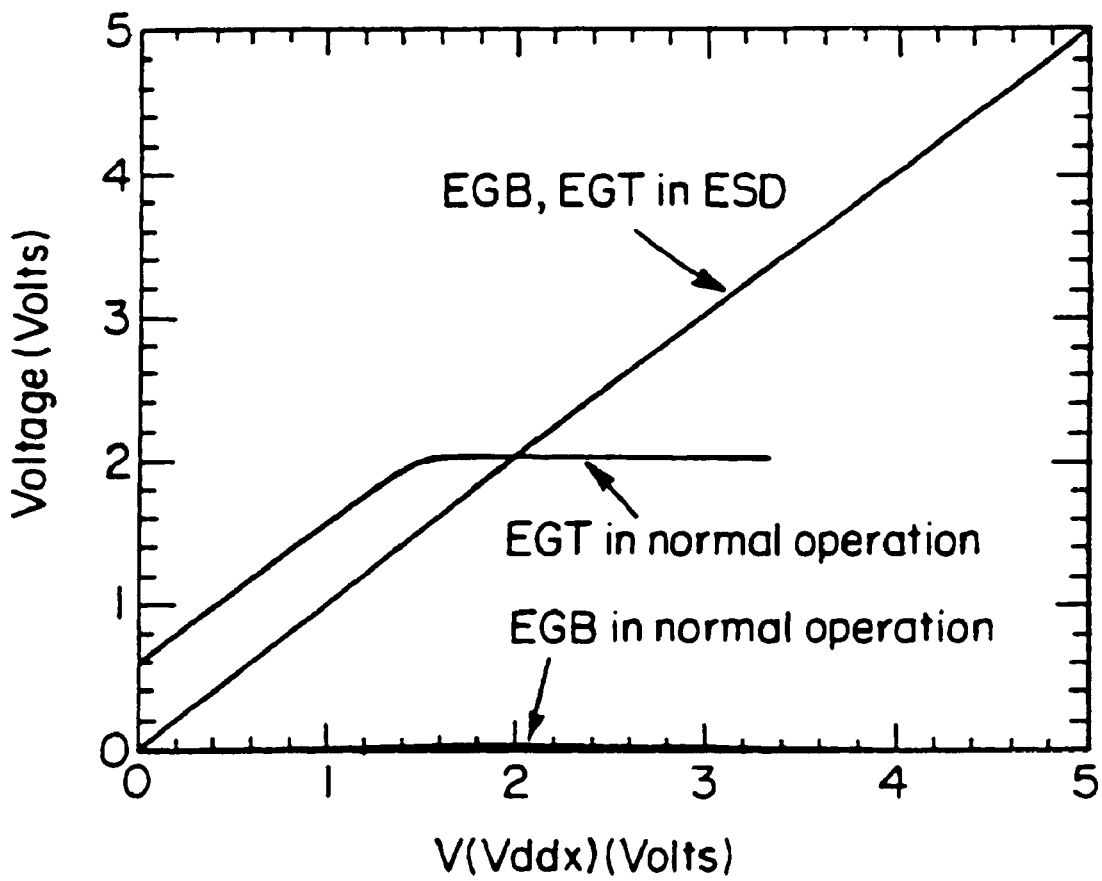
FIG. 3 is a chart of voltages within the circuitry of FIG. 2.

FIG. 3 is a simulation of the circuit of FIG. 2. The simulation examines the voltages on EGT and EGB nodes as a function of VDDX. During ESD, high-voltage reference conductor REF 36 is assumed to be at the reference voltage of VSS. Both gates rise following the voltage of VDDX. During normal operation, EGT rises to the two volt VDD level and EGB remains at ground. During normal operation, EGT only provides limited tracking to the VDDX voltage to protect from thin oxide damage. During ESD, however, EGB and EGT track VDDX to ensure efficient clamp operation.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An electrostatic discharge protection circuit for a protected, high-voltage pad of a semiconductor device to protect its internal circuits from electrostatic discharge, the protected high-voltage pad being designed to receive voltages during the operation of the internal circuits that are greater than a rated voltage of the semiconductor device, the protection circuit comprising:

a clamp stage, comprising at least two cascode-connected transistor clamps between the protected high-voltage pad and a reference conductor, that sinks electrostatic charge from the protected high-voltage pad to a reference conductor and away from the internal circuits; and a control stage that activates the clamp stage to couple electrostatic charge from the protected high-voltage pad and deactivates the clamp stage when the internal circuits are operational by reference to a control signal, which is derived from a high-voltage reference pad, the control stage reducing a magnitude of the control signal for at least one of the transistor clamps to less than a rated voltage of the semiconductor device.

2. The electrostatic discharge protection circuit of claim 1, wherein the control stage comprises at least one inverter circuit that is controlled by the control signal to activate and deactivate the transistor clamps.

3. The electrostatic discharge protection circuit of claim 2, wherein the control stage further comprises a voltage limiter that reduces a magnitude of the control signal for the at least one inverter circuit.

4. The electrostatic discharge protection circuit of claim 3, wherein the voltage limiter includes at least one transistor that is interconnected between the high-voltage reference pad and a control terminal of the inverting circuit.

5. The electrostatic discharge protection circuit of claim 4, further comprising a pull-down transistor that is interconnected between the control terminal and a reference conductor to limit a magnitude of the control signal when the internal circuits are operational.

6. The electrostatic discharge protection circuit of claim 1, wherein the control stage comprises:
  a first inverter circuit controlled by the control signal to activate and deactivate a first one of the transistor clamps; and
  a second inverter circuit controlled by the control signal to activate and deactivate a second one of the transistor clamps.

7. The electrostatic discharge protection circuit of claim 6, wherein the control stage further comprises a voltage limiter that reduces a magnitude of the control signal for the second one of the inverter circuits.

8. The electrostatic discharge protection circuit of claim 7, wherein the voltage limiter includes at least one transistor that is interconnected between the high-voltage reference pad and the second one of the inverting circuits.

9. The electrostatic discharge protection circuit of claim 6, further comprising a pull-down transistor that is interconnected between a control terminal of the second inverter circuit and the reference conductor to limit a magnitude of the control signal when the internal circuits are operational.

10. An electrostatic discharge protection circuit for a protected, high-voltage pad of a semiconductor device to protect its internal circuits from electrostatic discharge, the protected high-voltage pad receiving voltages during the operation of the internal circuits that is greater than a rated voltage of the semiconductor device, the protection circuit comprising:
  a clamp stage, comprising at least two cascode-connected transistor clamps between the protected high-voltage pad and a reference conductor, that sinks electrostatic charge from the protected high-voltage pad to a reference conductor and away from the internal circuits; and
  a control stage, comprising:
    a first inverter circuit and a second inverter circuit, each controlled by the control signal to activate and deactivate a respective one of the transistor clamps, the control signal being derived from a high-voltage reference pad,
    a voltage limiter that reduces a magnitude of the control signal for the second one of the inverter circuits, and
    a pull-down transistor that is interconnected between a control terminal of the second inverter circuit and the reference conductor to limit a magnitude of the control signal when the internal circuits are operational.

11. An electrostatic discharge protection method for a protected, high-voltage pad of a semiconductor device to protect its internal circuits from electrostatic discharge, the protection method comprising:
  receiving at the protected high-voltage pad voltages that are greater than a rated voltage of the semiconductor device, during the operation of the internal circuits;
  activating a clamp stage, comprising at least two cascodeconnected transistor clamps between the protected high-voltage pad and a reference conductor, to sink electrostatic charge from the protected high-voltage pad to a reference conductor and away from the internal circuits;
  deactivating the clamp stage when the internal circuits are operational by reference to a control signal, which is derived from a high-voltage reference pad; and
  reducing a magnitude of the control signal for at least one of the transistor clamps to less than a rated voltage of the semiconductor device.

12. The electrostatic discharge protection method of claim 1, further comprising the control stage driving the transistor clamps via at least one inverter circuit that is controlled by the control signal.

13. The electrostatic discharge protection method of claim 12, wherein the step of reducing the magnitude of the control signal comprises transmitting the control signal through transistor before receipt at a control terminal of the at least one inverting circuit.

14. The electrostatic discharge protection method of claim 13, further comprising pulling-down a voltage of the control terminal during operation of the internal circuits.

15. The electrostatic discharge protection method of claim 11, further comprising activating and deactivating the clamp transistors using respective a first and second inverter circuits controlled by the control signal.

16. The electrostatic discharge protection method of claim 15, wherein the step of reducing the magnitude of the control signal comprises transmitting the control signal through transistor before receipt at a control terminal of second inverter circuit.

17. An electrostatic discharge protection circuit for a protected, high-voltage pad of a semiconductor device to protect its internal circuits from electrostatic discharge, the protected high-voltage pad receiving voltages during the operation of the internal circuits that are greater than a rated voltage of the semiconductor device, the protection circuit comprising:
  clamp means, comprising at least two cascode-connected transistor clamps between the protected high-voltage pad and a reference conductor, for sinking electrostatic charge from the protected highvoltage pad to a reference conductor and away from the internal circuits; and
  control means for activating the clamp means to couple electrostatic charge from the protected high-voltage pad and for deactivating the clamp means when the internal circuits are operational by reference to a control signal, which is derived from a high-voltage reference pad, the control means further reducing a magnitude of the control signal for at least one of the transistor clamps to less than a rated voltage of the semiconductor device.

18. A system board comprising an integrated circuit, which includes an electrostatic discharge protection circuit for a protected, high-voltage pad of a semiconductor device to protect its internal circuits from electrostatic discharge, the protected high-voltage pad receiving voltages during the operation of the internal circuits that are greater than a rated voltage of the semiconductor device, the protection circuit comprising:
  a clamp stage, comprising at least two cascode-connected transistor clamps between the protected high-voltage pad and a reference conductor, that sinks electrostatic charge from the protected high-voltage pad to a reference conductor and away from the internal circuits; and
  a control stage that activates the clamp stage to couple electrostatic charge from the protected high-voltage pad and deactivates the clamp stage when the internal circuits are operational by reference to a control signal, which is derived from a high-voltage reference pad, the control stage reducing a magnitude of the control signal for at least one of the transistor clamps to less than a rated voltage of the semiconductor device.

* * * * *

UNITED STATES PATENT AND TRADEMARK OFFICE
CERTIFICATE OF CORRECTION

PATENT NO.   : 6,356,427 B1
DATED        : March 12, 2002
INVENTOR(S)  : Warren R. Anderson It is certified that error appears in the above-identified patent and that said Letters Patent is hereby corrected as shown below:

<u>Column 8,</u>
Line 2, delete "1" and insert -- 11 --.

Signed and Sealed this

Tenth Day of September, 2002

Attest:

Attesting Officer

JAMES E. ROGAN
*Director of the United States Patent and Trademark Office*